April 4, 1950   A. WARMISHAM   2,502,544
OPTICAL OBJECTIVE FOR PROFILE PROJECTIONS
Filed Feb. 7, 1948
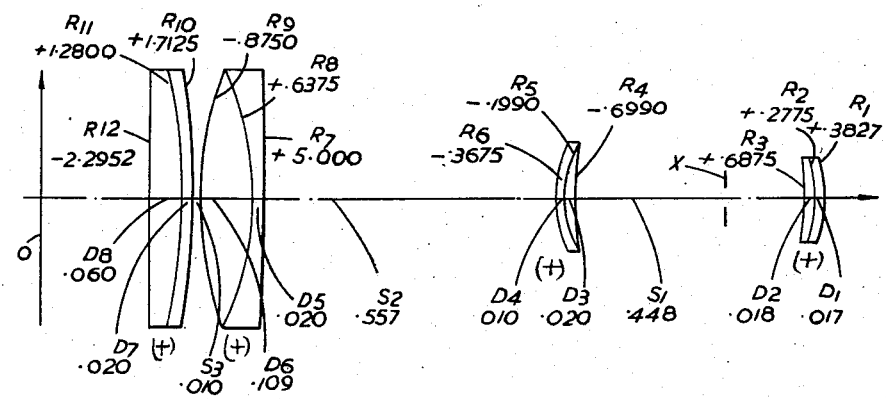
Inventor
ARTHUR WARMISHAM
By
Emery, Holcomb & Blair
Attorney Patented Apr. 4, 1950

2,502,544

UNITED STATES PATENT OFFICE 2,502,544

OPTICAL OBJECTIVE FOR PROFILE PROJECTIONS

Arthur Warmisham, Leicester, England, assignor to Taylor, Taylor & Hobson Limited, Leicester, England, a company of Great Britain Application February 7, 1948, Serial No. 6,876
In Great Britain February 21, 1947

8 Claims. (Cl. 88—57)

This invention relates to an optical objective for use in projecting an image of the profile of a solid object illuminated by collimated light from a source on the side of the object remote from the objective, the objective being corrected for spherical and chromatic aberrations, coma, astigmatism, field curvature and distortion, and comprising two convergent members, of which the rear member constitutes a field member and serves for forming an image of the light source at the optical stop position, in the neighbourhood of which the front member is disposed. It should be made clear that the "front" of the objective is the side of the longer conjugate, in accordance with usual convention, so that in profile projection the light passes through the objective from the rear to the front.

It is important in profile projection objectives to provide a high degree of correction for distortion. For example, with the objective of United States of America Patent No. 2,394,959, dated February 12, 1946, an objective of four inch focal length and magnification X50 covers a one inch objective field with the residual distortion error nowhere exceeding .0002 of an inch. The present invention has for its object to provide an improved profile projection objective giving at least as good distortion correction over a greatly increased field. Thus, an objective, according to the invention, of four inch focal length and magnification X50 can be made to cover a two inch objective field with a residual distortion not greater than .0002 of an inch throughout such field.

In the objective according to the invention, the rear member comprises two doublet components each containing a dispersive internal contact surface. The internal contact surfaces in the components of the rear member preferably each have a radius of curvature not less than half the equivalent focal length of the objective. Such contact surfaces are preferably cemented, the refractive indices of the materials separated by each of them differing by more than 0.1. The front member preferably comprises two doublet components separated by an air space within which the optical stop position lies. The two components of the front member are conveniently both of meniscus shape with their outer surfaces concave towards the stop position and the internal contact surfaces in the two components of such member are preferably also concave towards the stop position. The radii of curvature of the front surface of the front doublet and of the rear surface of the rear doublet of the front member conveniently both lie between .25 and .5 times the equivalent focal length of the objective, the radii of curvature of the other outer surfaces of these two doublets lying between .5 and 1.0 times such equivalent focal length.

A preferred practical example of objective according to the invention is illustrated in the accompanying drawings, and numerical data for this example are given in the following table, wherein $R_1$, $R_2$ . . . represent the radii of curvature of the surfaces of the objective, the positive sign indicating that the surface is convex to the front and the negative sign that it is concave thereto, $D_1$, $D_2$ . . . represent the axial thicknesses of the various elements, and $S_1$, $S_2$, $S_3$ . . . represent the axial air separations between individual components. The table also gives the mean refractive indices (for the D-line) and the Abbé V numbers of the materials used for the individual elements.

| Equivalent focal length 1.000. Relative Aperture F/16 | | | |
|---|---|---|---|
| Radius | Thickness or Air separation | Refractive Index $n_D$ | Abbé V number |
| $R_1$+ .3827 | $D_1$ .017 | 1.6512 | 33.6 |
| $R_2$+ .2775 | $D_2$ .018 | 1.5190 | 60.4 |
| $R_3$+ .6875 | $S_1$ .448 | | |
| $R_4$− .6990 | $D_3$ .020 | 1.5190 | 60.4 |
| $R_5$− .1990 | $D_4$ .010 | 1.6530 | 46.4 |
| $R_6$− .3675 | $S_2$ .557 | | |
| $R_7$+5.000 | $D_5$ .020 | 1.6512 | 33.6 |
| $R_8$+ .6375 | $D_6$ .109 | 1.5096 | 64.4 |
| $R_9$− .8750 | $S_3$ .010 | | |
| $R_{10}$+1.7125 | $D_7$ .020 | 1.6512 | 33.6 |
| $R_{11}$+1.2800 | $D_8$ .060 | 1.5096 | 64.4 |
| $R_{12}$−2.2952 | | | |

This example is corrected for magnification X50 and has its image plane 50 times the equivalent focal length in front of the front surface $R_1$ and its object plane (indicated at O in the drawing) .213 times such focal length behind the surface $R_{12}$. The optical stop position (indicated at X) lies between the surfaces $R_3$ and $R_4$ at .145 times such focal length from the surface $R_3$. The clear apertures of the front and rear components of the front member are respectively .156 and .225 times the equivalent focal length of the objective, and those of the front and rear components of the rear field member are respectively .500 and .512 times such focal length.

The internal contact surfaces in all four doublets in this example are cemented. The contact surfaces $R_9$ and $R_{10}$ in the rear field member are both dispersive, the index difference across each of them being .1416. The three surfaces $R_1$, $R_2$, $R_3$ of the front component of the front member and the three surfaces $R_4$, $R_5$, $R_6$ of the rear component of such member are all concave to the stop position.

What I claim as my invention and declare to secure by Letters Patent is:

1. An optical objective for profile projection, corrected for spherical and chromatic aberrations, coma, astigmatism, field curvature and distortion, and comprising two convergent members, of which the front member consists of two meniscus doublet components having their outer surfaces and also their internal contact surfaces all concave towards the optical stop position, which lies in the air space between the components, and the rear member constitutes a field member for focussing at the optical stop position collimated rays incident on the objective from the rear, such rear member consisting of two doublet components each containing a dispersive internal contact surface convex to the front, the radius of curvature of the contact surface in the rear doublet of the rear member lying between .9 and 1.75 times the equivalent focal length of the objective, whilst that of the contact surface in the front doublet of the rear member lies between .5 and .9 times such equivalent focal length.

2. An optical objective as claimed in claim 1, in which the radii of curvature of the front surface of the front doublet and of the rear surface of the rear doublet of the front member both lie between .25 and .5 times the equivalent focal length of the objective, whilst the radii of curvature of the other outer surfaces of these two doublets lie between .5 and 1.0 times such equivalent focal length.

3. An optical objective as claimed in claim 2, in which the internal contact surface in each of the components of the rear member is cemented, and the refractive indices of the materials separated by such surface differ by more than 0.1.

4. An optical objective as claimed in claim 1, in which the internal contact surface in each of the components of the rear member is cemented, and the refractive indices of the materials separated by such surface differ by more than 0.1.

5. An optical objective as claimed in claim 1, in which the radius of curvature of the internal contact surface in the front doublet of the front member lies between .2 and .4 times the equivalent focal length of the objective, and that of the internal contact surface in the rear doublet of the front member lies between .15 and .3 such equivalent focal length.

6. An optical objective as claimed in claim 1, in which the radii of curvature of the front surface of the front doublet and of the rear surface of the rear doublet of the front member both lie between .25 and .5 times the equivalent focal lengths of the objective, whilst the radii of curvature of the other outer surfaces of these doublets lie between .5 and 1.0 times such equivalent focal lengths, the radius of curvature of the internal contact surface in the front doublet of the front member lies between .2 and .4 times the equivalent focal length of the object, and that of the internal contact surface in the rear doublet of the front member lies between .15 and .3 times such equivalent focal length.

7. An optical objective as claimed in claim 1, in which the front surfaces of the two doublets of the rear member are convex to the front and the rear surfaces thereof concave to the front, the radii of curvature of the front and rear surfaces of the front doublet of the rear member lying respectively between 3.5 and 7.0 and between .65 and 1.2 times the equivalent focal length of the objective, whilst those of the front and rear surfaces of the rear doublet of the rear member lie respectively between 1.25 and 2.4 and between 1.7 and 3.1 times such equivalent focal length.

8. An optical objective as claimed in claim 1, in which the radii of curvature of the front surface of the front doublet and of the rear surface of the rear doublet of the front member both lie between .25 and .5 times the equivalent focal lengths of the objective, whilst the radii of curvature of the other outer surfaces of these doublets lie between .5 and 1.0 times such equivalent focal lengths, the front surfaces of the two doublets of the rear member are convex to the front and the rear surfaces thereof concave to the front, the radii of curvature of the front and rear surfaces of the front doublet of the rear member lying respectively between 3.5 and 7.0 and between .65 and 1.2 times the equivalent focal length of the objective, whilst those of the front and rear surfaces of the rear doublet of the rear member lie respectively between 1.25 and 2.4 and between 1.7 and 3.1 times such equivalent focal length.

ARTHUR WARMISHAM.

REFERENCES CITED

The following references are of record in the file of this patent:

UNITED STATES PATENTS

| Number | Name | Date |
|---|---|---|
| 35,605 | Harrison et al. | June 17, 1862 |
| 1,479,229 | Erfle | Jan. 1, 1924 |
| 1,629,361 | Polack | May 17, 1927 |
| 1,825,122 | Oswald | Sept. 29, 1931 |
| 2,388,031 | Bennett | Oct. 30, 1945 |
| 2,394,959 | Wynne | Feb. 12, 1946 |

FOREIGN PATENTS

| Number | Country | Date |
|---|---|---|
| 444,350 | Great Britain | Mar. 19, 1936 |
| 517,503 | Great Britain | Jan. 31, 1940 |
| 550,870 | Great Britain | Jan. 28, 1943 |